Jan. 13, 1925. 1,522,702
W. B. ROSEVEAR, JR
TRANSPLANTING MACHINE
Filed June 11, 1919 4 Sheets-Sheet 2
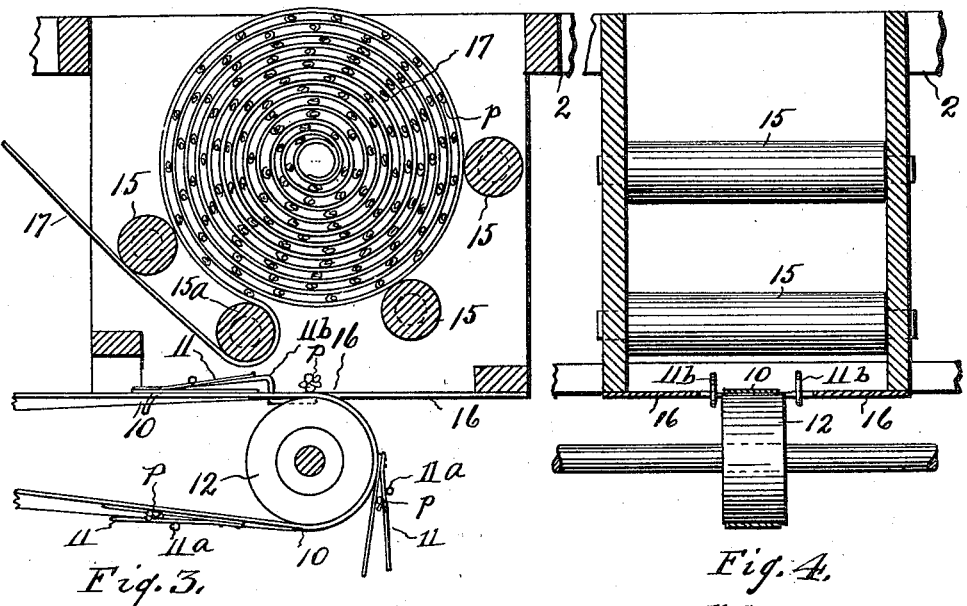
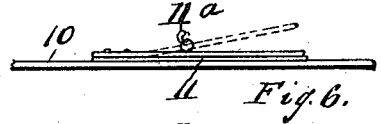
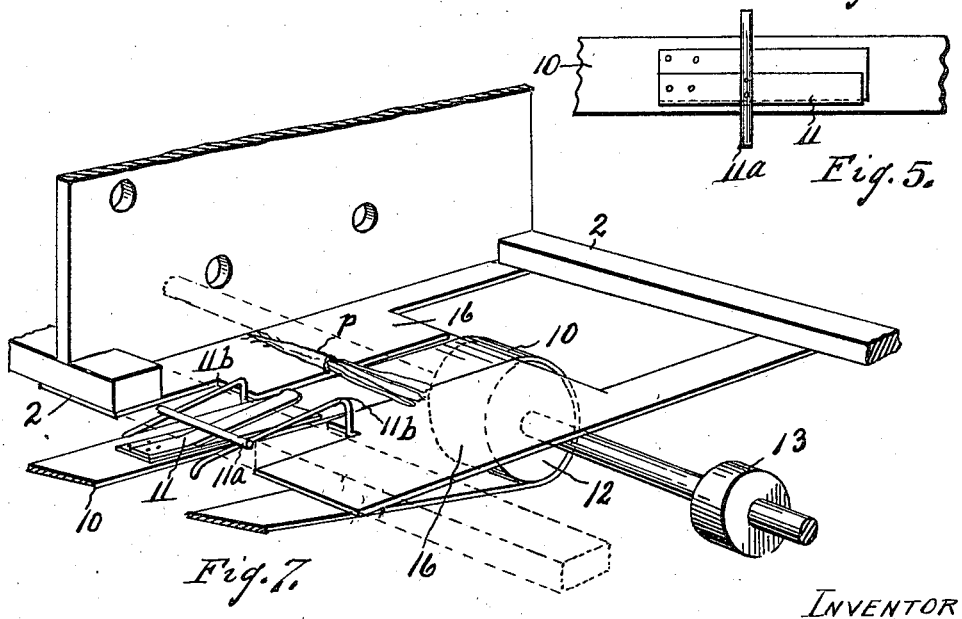
INVENTOR
WILLIAM B. ROSEVEAR JR.
BY
ATTORNEY.

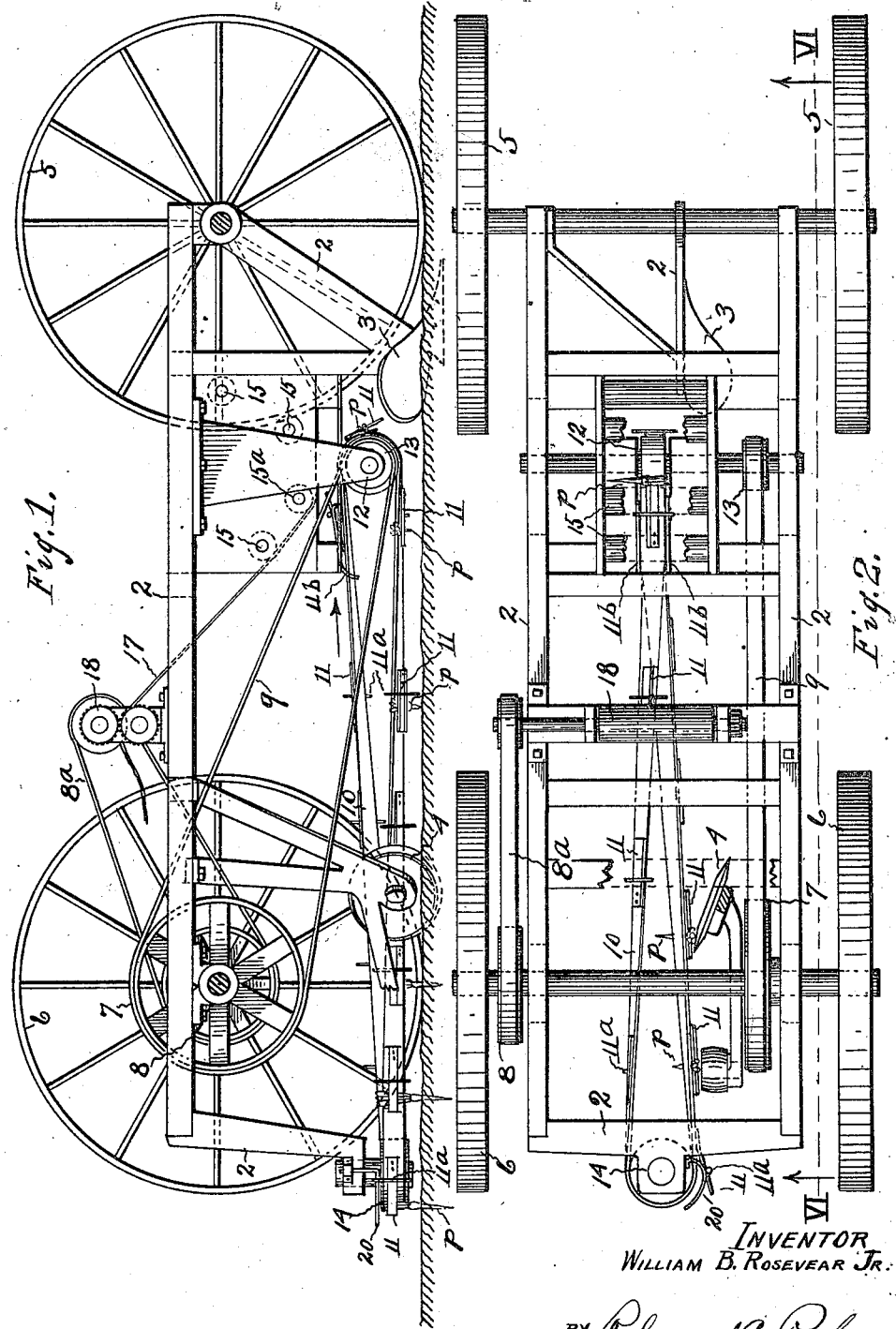

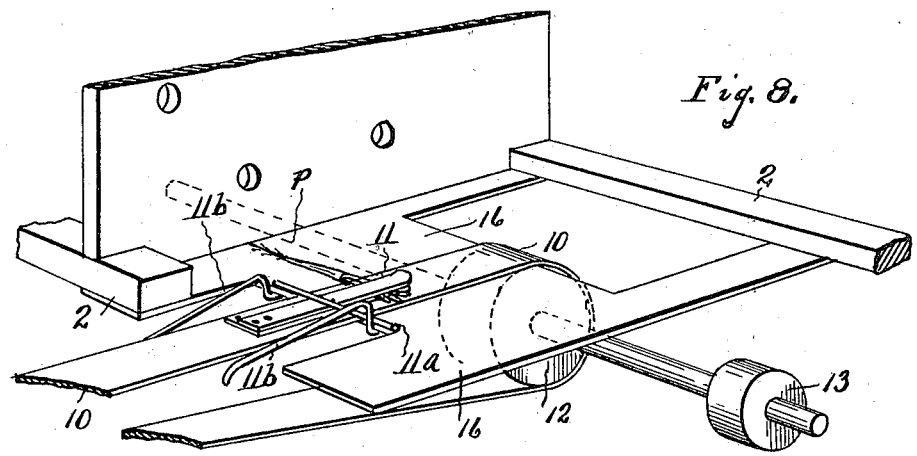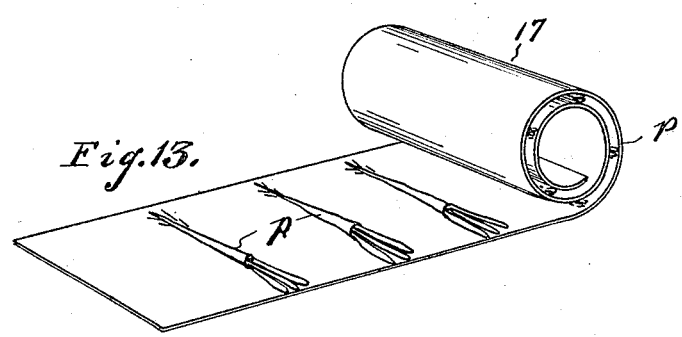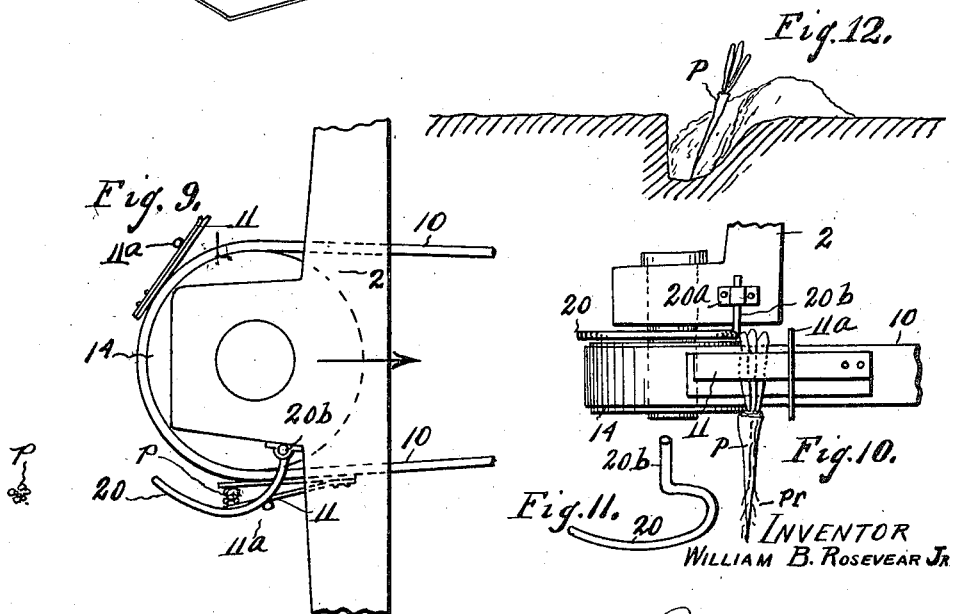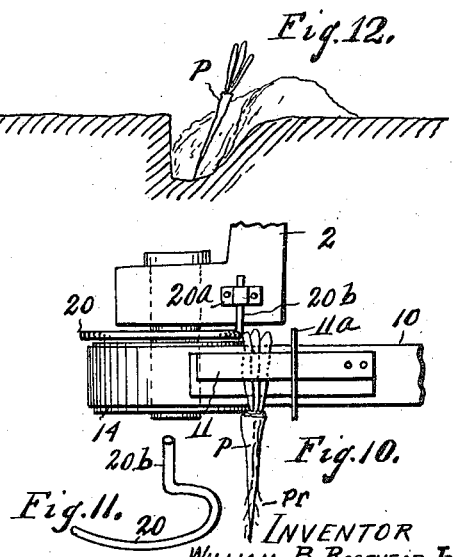

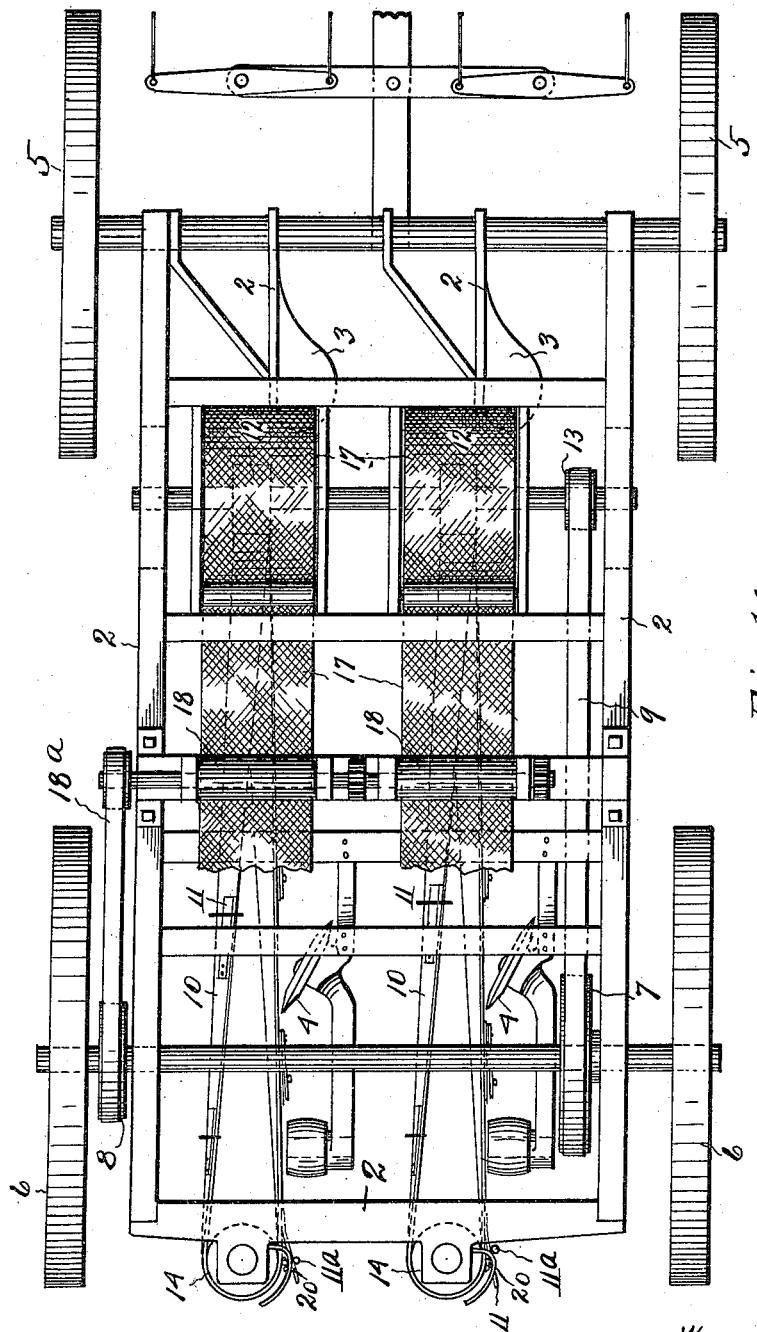

Patented Jan. 13, 1925.

1,522,702

UNITED STATES PATENT OFFICE.

WILLIAM B. ROSEVEAR, JR., OF DETROIT, MICHIGAN.

TRANSPLANTING MACHINE.

Application filed June 11, 1919. Serial No. 303,343.

*To all whom it may concern:*

Be it known that I, WILLIAM B. ROSEVEAR, Jr., a citizen of the United States, residing at Detroit, county of Wayne, State of Michigan, have invented a certain new and useful Improvement in Transplanting Machines, and declare the following to be a full, clear, and exact description of the same, such as will enable others skilled in the art to which it pertains to make and use the same, reference being had to the accompanying drawings, which form a part of this specification.

My invention relates to a transplanting machine for sugar beets.

In using this machine the seed is first planted in hot beds and when the plants have about two leaves they are placed in receiving holders which holders are then placed upon the transplanting machine in the field whereby the plants are automatically fed to said machine and set out by the machine at proper intervals in the field and in proper position for taking root and growing.

The machine is hereinafter specifically described.

Referring to the accompanying drawings:

Figure 1 is a side elevation of the machine used in setting the plants out in the field.

Figure 2 is a plan view of the same.

Figure 3 is a detail sectional elevation showing the plant holder in position upon the machine for setting out the plants and illustrating the automatic action of the same and coaction of the setting out or transplanting mechanism.

Figure 4 is a sectional plan of the apparatus shown in Figure 3 with the plant holder removed.

Figure 5 is a plan view showing a spring pad by which a plant is grasped to retain it on the conveyor of the transplanting belt until automatically released as hereinafter described.

Figure 6 is a side elevation of the parts shown in Figure 5.

Figure 7 is a perspective detail view of the apparatus by which the plants are placed upon and secured to the transplanting belt.

Figure 8 is a view similar to Figure 7 showing the plant grasped by the spring pad.

Figure 9 is a detail plan view showing the releasing mechanism for the plants.

Figure 10 is an elevation of the same.

Figure 11 is a detail perspective view of the cam rod for releasing the pad from engagement with the plant.

Figure 12 is a detail section illustrating the method of placing the plants in the furrow or trench for their reception.

Figure 13 is a perspective view of the plant receiver illustrating the method of placing the plants therein.

Figure 14 is a plan view showing an apparatus adapted to transplant or set out two rows.

When the plants have grown to a proper size for placing out in the field they are placed in a proper receiver and the latter is placed upon the transplanting machine.

The receiver consists of a roller belt 17 and the plants are placed upon the surface of the belt and as the belt is rolled up the plants are engaged between the folds or coils and held in their position, all as illustrated in Fig. 13. The belt 17 with a large number of plants, held parallel to each other and properly spaced, is then placed upon a set of rollers 15 15 15 and 15$^a$, as shown most distinctly in Fig. 3, and the end of the belt is passed around the roller 15$^a$, Fig. 3, and carried back to the friction rollers 18, which gradually unrolls the belt and feeds the plants consecutively to the machine.

Referring to Figure 1, 2 is a frame carried upon wheels 5 and 6. 3 is a ploughshare secured to a depending portion of the frame 2 and adapted to form a trench for receiving the plants as the wheel carried frame 2 is moved forward. 4 is a covering disk pivoted to a depending portion of the frame 2 and adapted to cover the plants that have been placed in the trench formed by the ploughshare 3. 7 and 8 are pulleys upon the axle of opposite wheels 6, 6. 13 is a pulley upon a shaft pivoted transversely of the machine below the rollers 15. The belt 9 passes over the pulley 7 and the pulley 13 so that when the machine is moved forward the turning of the wheel 6 shall actuate the pulley 13 by means of the belt 9 and pulley 7. 8$^a$ is a belt passing over the pulley 8 and adapted to convey motion therefrom to the friction rollers 18. 12 is a pulley upon the same shaft as the pulley 13. 10 is a belt passing over the pulley 12 making a quarter turn and passing around the horizontally disposed pulley 14 at the rear of the frame 2. The lower strand of the belt 10 is parallel and adjacent to the trench in which the plants are to be deposited. The upper strand of said belt passes below the roller 15ᵃ in position to grasp the plants as they are delivered from the belt supported by the rollers 15 15ᵃ. 11 indicates spring pads adapted to grasp, hold, and release the plants at the proper time. These pads are secured as shown upon the belt 10 and are provided with a cross bar 11ᵃ which as the belt 10 moves rides upon cam rods 11ᵇ, (Fig. 7) to raise the pad 11 up and when it has passed the cams 11ᵇ the pad 11 is permitted to fall grasping the plant.

16, 16 (Fig. 7) are tables having their adjacent edges parallel. The upper strand of the belt 10 passes between the edges of said tables substantially filling the intervening space. As the belt 17 is unwound the plants fall upon the tables 16, 16, as shown in Fig. 7, with their roots lying upon one of said tables and their leaves extending across the space of the adjacent edges of said table. Thus as the pad 11 is raised it passes over the bunch of leaves of the plant and when the cross piece 11ᵃ passes beyond the cam the resilience of the released pad engages the leaves of the plant and binds it to the belt, 10. The belt 10 then carries the plant downward to its understrand, turns it to a position at about 30 degrees to the vertical with its root downward as shown in Fig. 12 and extending into the trench. The disk 4 then throws the earth around the plant to hold the same in position.

The pulleys actuating the belt 10 are so proportioned that said strand shall travel backward at the same rate that the machine travels forward and therefore there is no relative motion between the lower strand of said belt and the earth. When the belt 10 begins to pass around the pulley 14 the cross piece 11ᵃ of the pad 11 engages a cam rod 20 supported in a socket 20ᵇ by an up-turned portion 20ᵃ of said rod engaging in said socket so that the pad is lifted from the belt and the plant released and left in its proper position and properly covered for maturing in the field.

A plurality of rows may obviously be set out at once by adapting the machine to this purpose. In Fig. 14 I have shown a machine adapted for setting out two rows simultaneously but obviously any number within convenient proportions could be used.

What I claim is:

1. In a transplanting machine, the combination of the horizontal tables 16, 16, located with their adjacent edges at a distance from each other forming an intervening space, means for delivering a plant upon said tables with the part to be grasped extending transversely of said space, a belt having a spring pad, means for passing said belt continuously adjacent to said space, and means for raising said pad to pass over said transversely extending portion of the plant and for releasing said pad to engage the same.

2. In a transplanting machine, the combination of the horizontal tables 16, 16, located with their adjacent edges at a distance from each other forming an intervening space, means for delivering a plant upon said tables with the part to be grasped extending transversely of said space, a belt having a spring pad, means for passing said belt continuously adjacent to said space, and means for raising said pad to pass over said transversely extending portion of the plant and for releasing said pad to engage the same, said means consisting of a stationary cam located outside said belt in position to engage a projecting portion of said pad.

3. In a transplanting machine, the combination of a rolled belt having properly positioned plants engaging between its coils, means for revolubly holding said coils with the axis in the horizontal position, a guide adapted to hold the loosening strand of said belt in position on the coil up to a position near the lower portion of said coil, said strand passing around said guide and backward, and means for drawing upon said strand to unwind the coils.

4. In a transplanting machine, an endless carrier belt passing over a pulley with a horizontal axis at the receiving end and being warped and passing around a pulley with a substantially vertical axis at the other end, means for engaging plants upon the receiving end of said belt in a position transverse to said belt and of releasing the plants at the other end of said belt, and means for covering the plant with earth a short distance before it passes around the pulley with the substantially vertical axis.

In testimony whereof, I sign this specification.

WILLIAM B. ROSEVEAR, Jr.